Aug. 10, 1943. H. F. CALDWELL 2,326,436
LABEL ATTACHING MACHINE
Filed June 19, 1941 6 Sheets-Sheet 1

Inventor
Harry F. Caldwell
By Linnane and
Van Antwerp
Attorneys

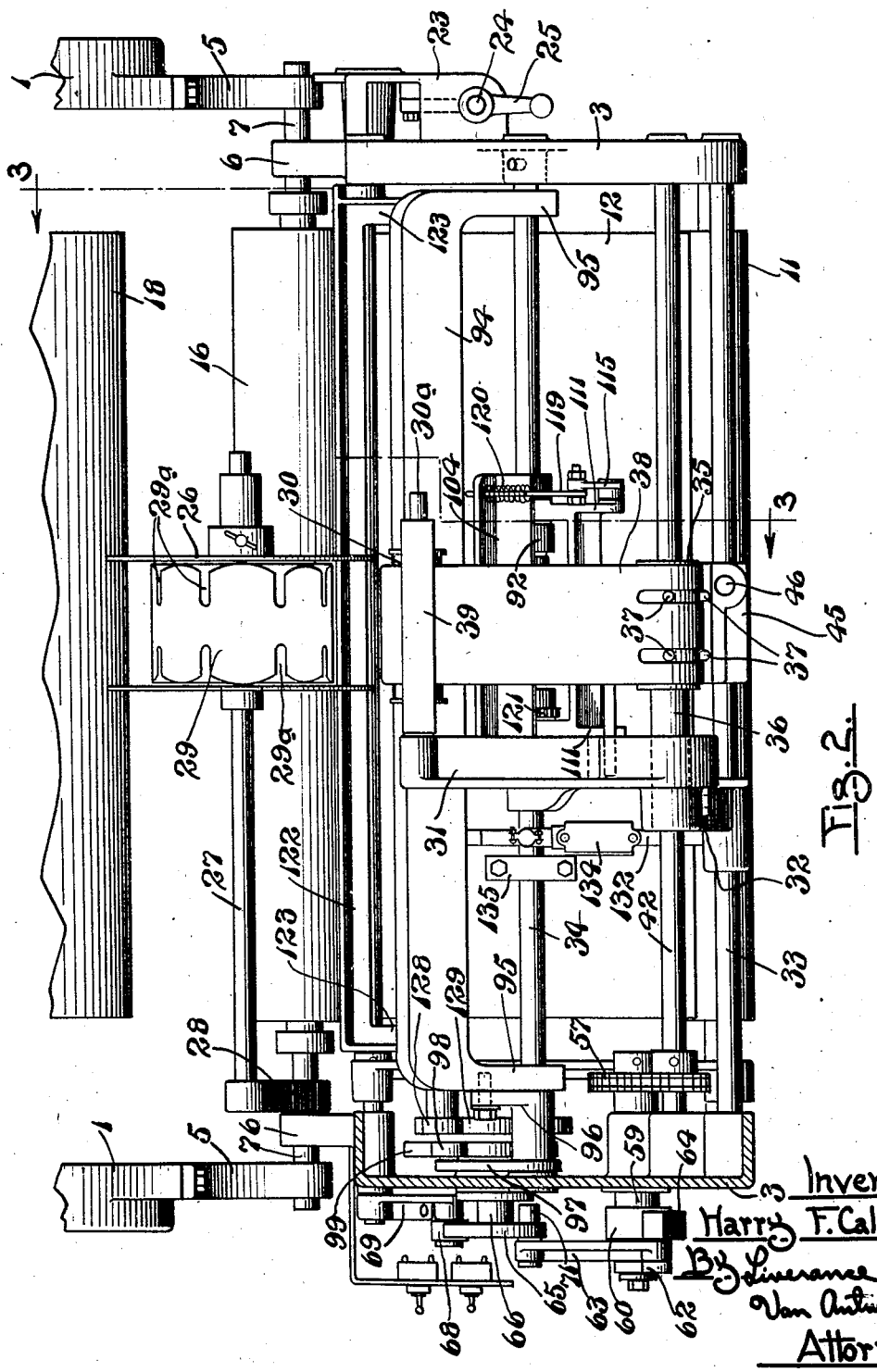

Aug. 10, 1943.   H. F. CALDWELL   2,326,436
LABEL ATTACHING MACHINE
Filed June 19, 1941   6 Sheets-Sheet 4

Inventor
Harry F. Caldwell
By Liverance and Van Antwerp
Attorneys

Aug. 10, 1943. H. F. CALDWELL 2,326,436

LABEL ATTACHING MACHINE

Filed June 19, 1941 6 Sheets-Sheet 5

Inventor
Harry F. Caldwell
By Liverance and Van Antwerp
Attorneys

Aug. 10, 1943.   H. F. CALDWELL   2,326,436
LABEL ATTACHING MACHINE
Filed June 19, 1941   6 Sheets-Sheet 6

Inventor
Harry F. Caldwell
By Liverance and Van Antwerp
Attorneys

Patented Aug. 10, 1943

2,326,436

UNITED STATES PATENT OFFICE 2,326,436

LABEL ATTACHING MACHINE

Harry F. Caldwell, Grand Rapids, Mich., assignor, by mesne assignments, to Oliver Machinery Company, Grand Rapids, Mich., a limited partnership of Michigan Application June 19, 1941, Serial No. 398,786

15 Claims. (Cl. 216—29)

This invention relates to a label attaching unit which is designed to be connected with a wrapping machine. I have heretofore obtained Patent No. 2,244,140, granted June 3, 1941, relating to label machine for attachment or association with a wrapping machine, particularly of the character shown in a still earlier application, Serial No. 247,063, filed December 21, 1938, produced by myself, jointly with Howard B. Tuthill, now Patent No. 2,310,719, granted Feb. 9, 1943, which latter application referred primarily to wrapping loaves of bread though not necessarily restricted to bread wrapping alone. In the present invention the label machine is a substantially independent unit in itself which may be connected and associated with many and varied types of wrapping machines and is not restricted in use to a wrapping machine of any particular construction and operation.

Loaves of bread and other articles which are wrapped for protection preferably should be labeled, and the present invention is in connection with a label attaching machine usable with the wrapping machine and with which, simultaneously with the wrapping of each article, a label is applied and connected to the wrapper. The label may carry certain indicia such as the name of the article, and the producer, its date of wrapping and advertising with respect thereto and the like.

A primary object and purpose of the present invention is to provide a label attaching machine for connection to or association with a wrapping machine for attaching a label to each article wrapped so that when passed through the wrapping machine each article will be complete both as to wrapping and labeling. A further object of the invention is to provide a complete machine unit insofar as the labels and their attachment is concerned which requires for its operation in connection with the wrapping machine to which it is connected or with which it is associated only the operation and closing of a switch in an electric circuit by a moving part in the wrapping machine, which moving part of the wrapping machine will close the switch once with each cycle of operation; and by cycle of operation is meant the cycle of operations which carries through the wrapping of a single article in the wrapping machine. It is further to be understood that the independent label attaching machine of the present invention may be utilized to attach labels to wrapped articles or packages with slight changes or modifications.

Various other objects and purposes and novel constructions for attaining the same are desirably produced by my invention, including novel means for changing the time of deposition of the labels, one after another upon the wrapping paper which is going to the wrapping machine, required when loaves or articles of different sizes are to be wrapped in the wrapping machine; a machine as an independent unit having its own power unit or prime mover to operate the mechanism for feeding the labels to the wrapping paper or to a wrapped article; a novel means for applying heat for securing individual labels to the wrapping paper at properly spaced apart distances in its length; and many other novel arrangements and association of parts for practically and efficiently controlling the deposition and application of the labels to the wrapping paper, reference being had to the accompanying drawings disclosing such embodiment, in which, Fig. 1 is a side elevation of the label attaching machine of my invention located at one end of a wrapping machine, a fragmentary portion only of which is shown.

Fig. 2 is an enlarged plan view thereof with a part in section for a better disclosure.

Like reference characters refer to like parts in the different figures of the drawings, and the sectional views are all taken looking in the directions indicated by the arrows.

Figure 1:
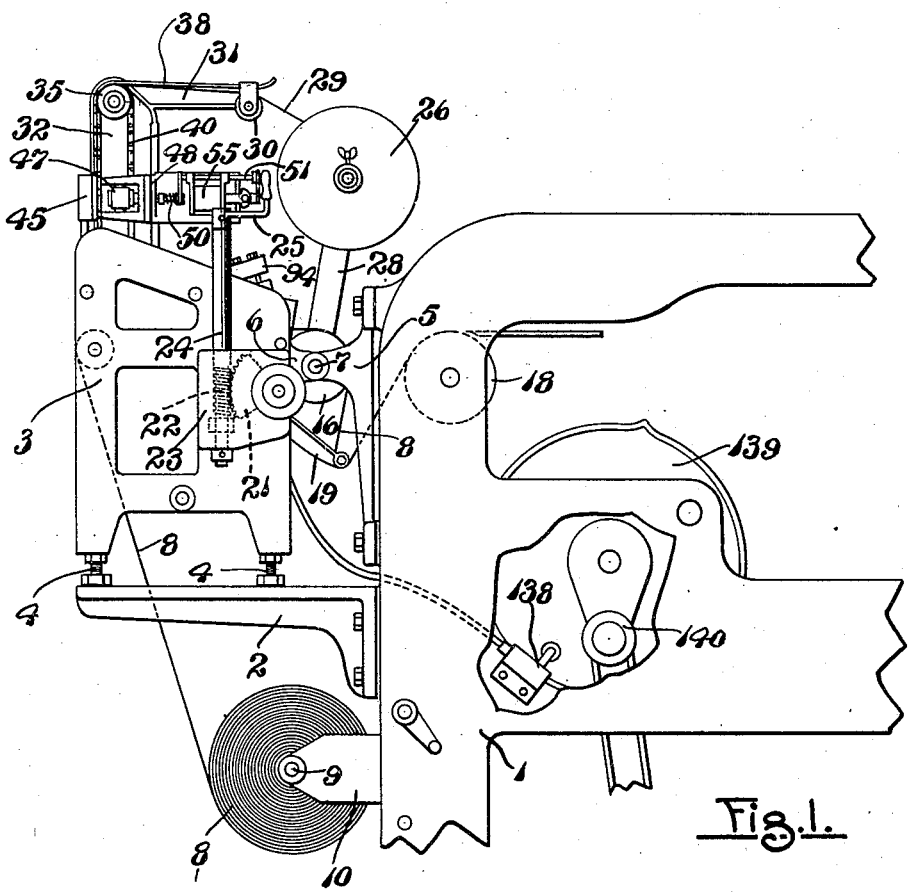

The wrapping machine frame 1, shown fragmentarily in Fig. 1, at an end thereof has a horizontal supporting bracket 2 secured in place, upon which the label attaching machine of my invention is to be supported. Said machine has spaced apart end frames 3 with adjustable foot members 4 which rest upon the upper side of the bracket 2. A vertical bracket 5 is bolted above the bracket 2 at the same end of the wrapping machine frame 1 and has horizontal outwardly extending ears through which a rod or shaft 7 passes, it also passing through ears 6 extending one from each end frame 3 as best shown in Fig. 2, thereby positioning the label attaching machine in proper relation to the wrapping machine and holding it in such position. It is of course to be understood that the label attaching machine does not necessarily require a direct physical connection to the wrapping machine so long as it is properly positioned with relation thereto and is maintained in such position.

Figure 3:
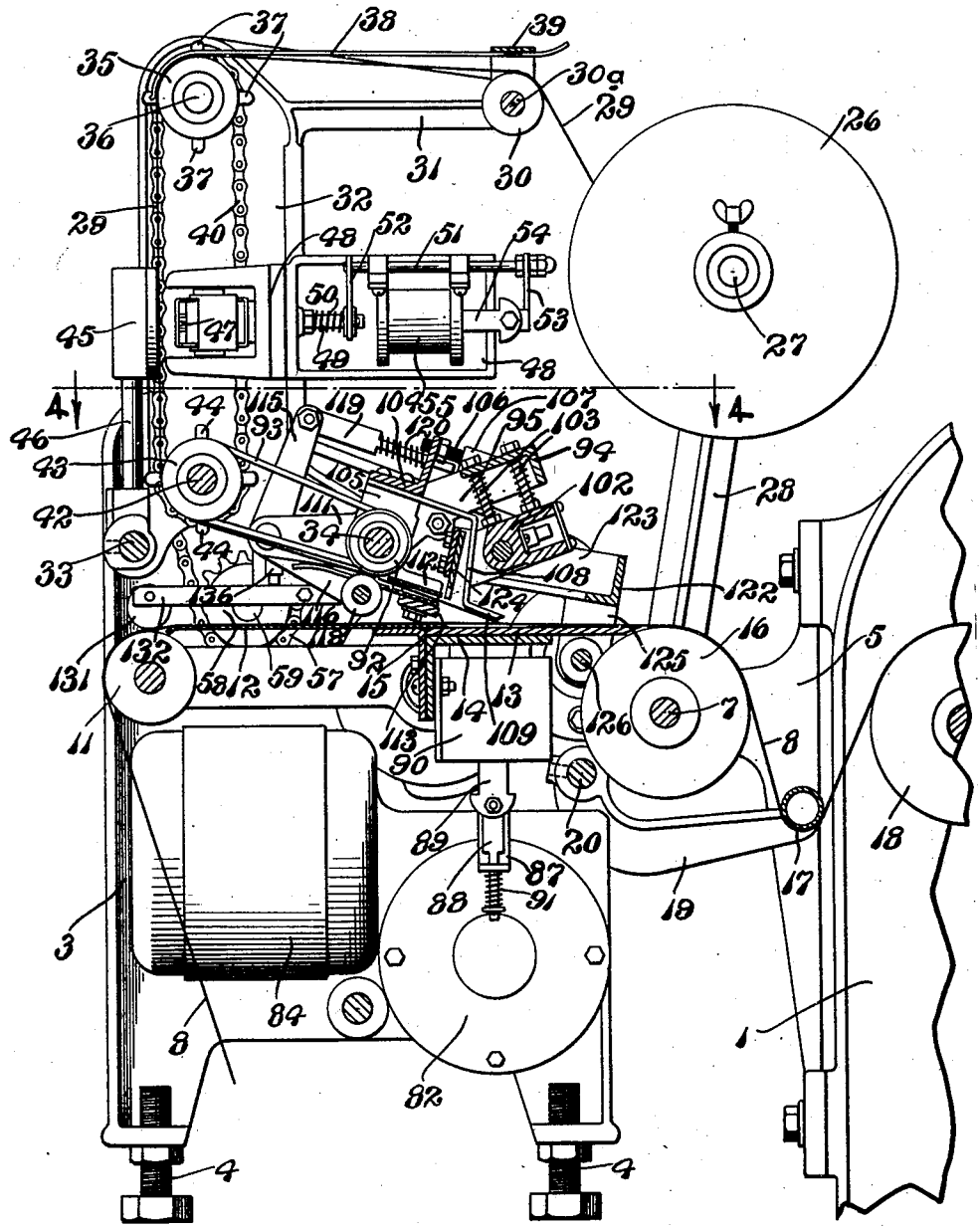
Fig. 3 is a vertical section through the label attaching machine.

The wrapping paper 8 which is to be used for wrapping loaves of bread or other articles in the wrapping machine is mounted in a roll on a suitable shaft 9 carried by brackets 10 (Fig. 1) extending from the frame 1. The paper is led upwardly to and over a roller 11 on a suitable shaft mounted on and extending between the end frames 1 on the machine (Fig. 3) which roller is located between the upper and lower ends of said frames 3. The paper is directed by said roller over a horizontal plate 12 of sheet metal which overlaps a horizontal table 13 carried on and above an angle cross bar 14, to which a second angle cross bar 15 is bolted or otherwise secured as shown in Fig. 3. The edge of the table 14 nearest the wrapping machine comes closely adjacent a roller 16 rotatably mounted on the shaft 7 which is a fixed shaft with a roller 16 rotating about it. The paper 8 is carried over the upper side of the roller 16, thence downwardly underneath an adjustable roller 17 and therefrom into the wrapping machine over a drum 18 which is a part of the wrapping machine.

The roller 17 is carried by and between the end portions of two spaced apart arms 19 (Fig. 3) fixed to a horizontal rock shaft 20 which extends between the end frames 3 of the machine. Shaft 20 carries a worm wheel sector 21 (Fig. 1) which is engaged by a worm 22, said sector and worm being housed within a housing 23 secured at one end of the machine (Fig. 1). The worm 22 is on a vertical shaft 24 mounted in the housing 23 and equipped at its upper end with a crank 25. By turning the crank 25, the arms 19 may be raised or lowered dependent upon the direction of turning the crank and thus change the position of roller 17.

Figure 12:
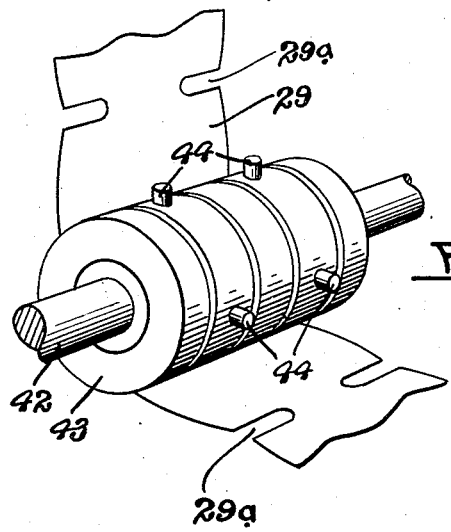
Fig. 12 is a perspective view illustrating the drive roller for properly feeding the continuous connected together labels into the machine.

A spool 26 is mounted for rotation on a horizontal rod 27 which is supported at one end by a substantially upright arm 28 extending down to and connected rigidly with the fixed rod or shaft 7 (Fig. 2). The labels 29 are wound on the spool. Said labels are connected together with spaced slots 29a extending inwardly from each edge of the label strip toward each other as shown in Figs. 2 and 12, a complete label being located between consecutive pairs of slots 29a. The continuous length or strip of labels is carried from the spool upwardly over a roller 30 mounted on a rod 30a extending from the free end of a horizontal arm 31 which extends from a vertical casting support 32 at its lower end mounted upon two spaced parallel rods 33 and 34 being fixedly secured to the rod 33 to prevent lateral movement. The rods 33 and 34 are located in substantially the same horizontal plane and extend between the end frames 3 of the machine.

The label strip after passing over the upper part of the roller 30 is carried to and over a drum 35 rotatably mounted on a fixed rod or shaft 36 extending laterally from the upper end of the supporting post 32. The drum has two series of pins 37, each series being four in number, which project radially therefrom and are located at 90° intervals around the drum. The distance between any two adjacent pins 37 is equal to the width of a label so that the pins enter the slots 29a of the label strip. A friction brake member 38 in the form of a sheet metal plate has a free end portion curved to rest upon the label strip as it passes over and downwardly around the drum 35, and the said free end has slots (Fig. 2) for the passage of the pins 37. At its other end, directly over the roller 30, it is permanently secured to a U-shaped stirrup 39, the legs of which are turned downwardly and are pivotally joined with the rod or shaft 30a on which the roller 30 is mounted. Thus the member 38 may be turned upwardly about the axis of the rod 30a in threading a new label strip through the machine over the drum 35, and returned to place after the strip has been passed over said drum.

Figure 4:
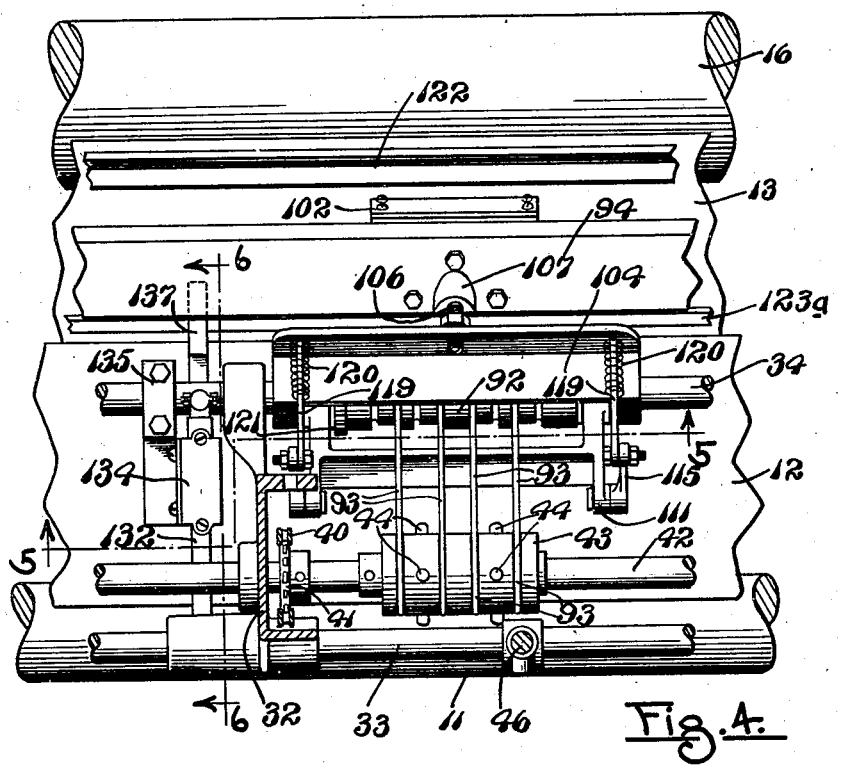
Fig. 4 is a fragmentary horizontal section substantially on the plane of line 4—4 of Fig. 3.

An endless chain 40 passes around a sprocket wheel at one end of the drum 35 and also around a second sprocket wheel 41 (Fig. 4) pinned to a horizontal shaft 42 which is located a short distance above and inwardly of the rod 33 (Figs. 3 and 4). A second drum 43 like the drum 35 is mounted on and secured to the shaft 42 and it likewise has two series of pins 44 extending radially therefrom and spaced at 90° intervals for entering the slots 29a in the label strip. The drum 35 is driven from the shaft 42 through the sprocket and chain connection described at equal speeds.

The label strip passes downwardly in a substantially vertical plane from the upper drum 35 to the lower drum 43; and each label may be printed with desired indicia during such passage. A backing member 45 against which labels are pressed in printing is mounted at the upper end of a vertical post 46 which through suitable connections is permanently secured to the rod 33. The printing unit is disposed to a side of the backing member 45 with the label strip passing between. The immediate printing plate or other type carrier 47 is normally disposed a distance from the label strip, as in Fig. 3, and is mounted in a guide fork of the frame 48 of the printing unit. A rod 49 actuated by a spring 50 to normally withdraw the part 47 is guided through the printing frame. A second rod 51 is slidably mounted in suitable guides on the printing frame and is connected at one end by a link 52 with the rod 49. At its other end a link 53 connects it with the armature 54 of a solenoid 55 the energizing of which draws the armature into the solenoid and moves the immediate printing mechanism to the left (Fig. 3) compressing spring 49 and bringing the immediate printing plate 47 against a label and forcing the label against the backing plate. The automatic closing of a switch in an electric circuit which includes the solenoid winding 55 in proper timed relationship with the intervals of rest between successive step by step movements of the label strip will be hereafter described.

Figure 9:
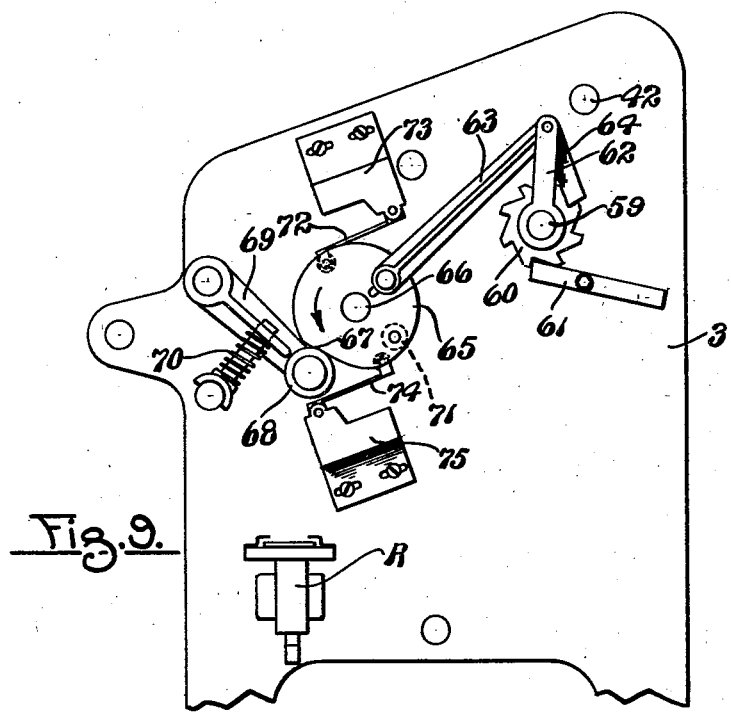
Fig. 9 is an end elevation looking at the left hand end of Fig. 2.

Shaft 42 is provided with a sprocket wheel 56 (Fig. 7) toward one end thereof to be driven by an endless chain 57 which also engages with a second sprocket wheel 58 on a horizontal stub shaft 59 mounted on one end frame 3 of the machine (Figs. 2 and 9). The shaft 59 at its outer end carries a ratchet wheel 60 (Fig. 9) which is normally engaged by a dog 61 permitting rotative movement of the ratchet wheel in one direction only. An arm 62 is mounted at its lower end to rock on the end of the shaft 59 and at its upper end has pivotal connection with a connecting rod 63 and an operating dog 64. The operating dog 64 engages the teeth of the ratchet wheel in succession to move it in a clockwise direction (Fig. 9) in successive steps. The connecting rod 63 at its other end is pivotally connected a distance from the center of a disk 65 secured to a short shaft 66 mounted on the same end frame 3. The rotation of the disk 65 reciprocates the connecting rod 63 in a manner similar to a pitman operation. The disk 65 being designed to be operated for single rotations with intervals of rest between, at one side of the disk it is provided with a shallow recess or flat 67 against which a roller 68 may bear at times. The roller 68 is carried at one end of a pivotally mounted arm 69 pressed by coiled spring 70 (Fig. 9) so as to force the roller 68 against the edges of the disk 65 and cause the disk at the end of a single complete rotation to come to rest with the roller 68 engaged against the portion 67 of the disk.

At the inner side of the disk 65 (Fig. 9) a short laterally extending roller 71 is mounted which in the counterclockwise rotation of the disk, as indicated by the arrow, engages a pivotally mounted switch closer 72 for an electric switch 73 and thereafter a second switch closer 74 for an electric switch 75. The switch at 73 is to be located in the electric circuit which contains the solenoid winding 55 to close such circuit and operate the printing mechanism. The switch 75 is in a different electric circuit shown in Fig. 10, the function and operation of which will hereinafter appear.

The shaft 66 on which disk 65 is secured is driven by an endless chain 76 engaging with a sprocket wheel 77 secured to the inner end of the shaft 66 (Fig. 7), which chain also passes around a second sprocket wheel 78 integral with or permanently connected to a movable clutch member 79 on a shaft 80 (Fig. 8) which clutch member is movable into and out of engagement with a second clutch member 81 fixed to said shaft. Shaft 80 extends into a housing 82 which houses suitable worm gearing interposed between the shaft 80 and the shaft 83 of an electric motor 84 to greatly reduce the speed of rotation of the shaft 80 with respect to the high speed of rotation of the motor shaft. When the machine is in operation the electric motor 84 is running continuously, but the shaft 66 and the parts driven and operated thereby are in movement only when the clutch members 79 and 81 are connected.

The movable clutch member 79 is grooved at one end (Fig. 8) for engagement with a yoke 85 which is pivotally mounted between its ends at 86. A bar 87 is connected at one end to the upper end of the yoke 85 and at its other end a vertical rod 88 passes freely through the bar. The rod 88 at its upper end is connected with the armature 89 of a solenoid 90. Rod 88 below the bar 87 has a light coiled spring 91 around it which rests upon a washer near the lower end of said rod. When the solenoid is energized by the completion of an electric circuit including it, the armature is moved upward with a corresponding upward movement of the bar 87 at the end connected therewith, which causes the yoke 85 to be turned about the pin 86 and move the movable clutch member 79 into engagement with the fixed clutch member 81.

Figure 5:
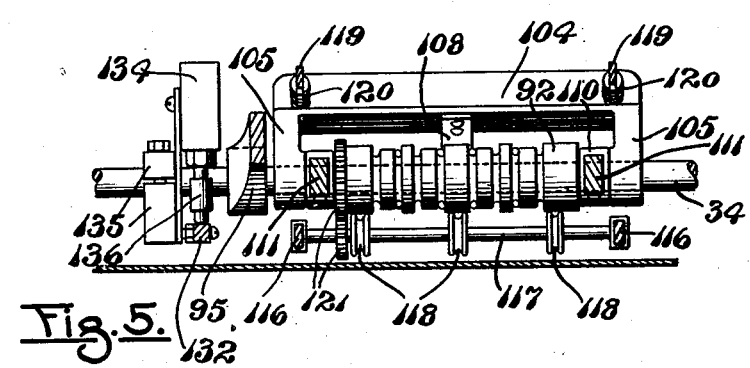
Fig. 5 is a fragmentary longitudinal vertical section on the plane of line 5—5 of Fig. 4.

The label strip 29 after passing downwardly and under the drum 43 is directed downwardly and inwardly into the machine underneath a roller 92 which is loosely mounted for rotation on the rod 34. It is to be understood that the rod 34 is fixed at its ends in the end frames 3 of the machine like the rod 33. The drum 43 and the roller 92 are grooved at spaced distances (Figs. 4 and 5) for endless belts 93 to pass therearound for driving roller 92 from the drum 43.

An angle bar 94 is provided with inturned arms 95 (Fig. 2) pivotally mounted upon the shaft or rod 34 and normally extending upwardly and away from said rod or shaft. To one of said arms at one end of the bar 94 a sleeve 96 is secured (Figs. 2 and 7), through which the rod 34 passes, and from which an arm 97 extends equipped with a roller 98 which rides upon a cam 99 fixed to the stub shaft 66. The cam 99 has a short depression or recess 100 (Fig. 7) and a much longer depression or recess 101 immediately thereafter, the remainder of the edge of the cam, which is in the form of a disk, being the arc of a circle. With the roller 99 riding upon the circular edge of the cam of greatest radius, bar 94 is slightly depressed momentarily when the recess 100 comes thereto and then upon reaching the recess at 101 it is depressed a much greater extent and for a longer time, or until the cam has moved far enough to carry said recess 101 past the roller 99.

A heater 102 is yieldingly mounted by rods 103 with coiled springs therearound at the under side of the bar 94 and said heater in the lowermost position of the bar 94, or when the roller 99 is traversing the recess 101, is brought to a down position to press against a label lying upon the upper side of the wrapping paper 8 over the table 13.

Lying over the rod 34 is a short angle bar 104 having downwardly extendings arms 105 pivotally mounted upon said rod. The upwardly extending leg of the bar 104 carries an adjustable screw 106, an end of which comes against a boss 107 at the upper side of the bar 94. A metal finger 108 is attached to the under side of the bar 104 and extends toward the heater and thence downwardly to one side thereof and terminates in an inclined terminal finger 109 underneath which the labels pass to the upper side of the wrapping paper. The end labels are severed one after another from the label strip and one at a time during the operation of the machine, and when the roller 98 momentarily enters the recess 100 of cam 99 the finger 109 engages against the upper side of the label which is to be severed from the label strip and holds it against the paper during such severing and during the period the heating unit comes to its lowermost position and presses against the upper side of the label, supplying it with heat and cementing it to the wrapping paper. Of course it is to be understood that the under side of the labels engaging the upper side of the wrapping paper are suitably treated so that on heat being applied they will be cemented to the paper.

Figure 11:
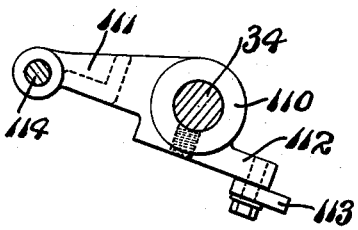
Fig. 11 is an enlarged detail in elevation of one of the members carrying one of the knives for cutting the labels one at a time from a continuous strip of labels.

Two spaced apart sleeves 110 are located around the rod 34 and fixed thereto (Fig. 11) from which arms 111 extend in one direction and fingers 112 in the opposite direction. Said sleeves are located between the ends of the roller 92 and the arms 105 mounting angle bar 104 on the rod 34. A fixed knife blade 113 extends between and under the fingers 112 and is permanently secured thereto, having a cutting edge extending slightly beyond the ends of the fingers 112. Such cutting edge is located a short distance below the path of the wrapping paper 8 through the labeling machine (Fig. 3). As also shown in Fig. 3, the label strip when passing from underneath the roller 92 goes between two spaced apart thin guide plates (not numbered) which are located between said fingers 112.

A horizontal rod 114 extends between the free ends of the arms 111 on which two spaced apart bell crank levers are pivotally mounted each having an upwardly extending arm 115, and a downwardly and inwardly extending arm 116. A shaft 117 is mounted between the ends of the lower arms 116 and carries rollers 118 which come against the roller 92 at the parts thereof between the grooves so that the label strip is drawn between the upper and lower rollers 92 and 118. Bars 119 are pivotally connected to the upper ends of the arms 115, are reduced in size at a distance away therefrom and pass through openings in the upwardly extending leg of the angle bar 104, with coiled compression springs 120 between the bars 119 and the angle bar 104 which act to yieldingly press rollers 118 against roller 92. Gears 121 on roller 92 and shaft 117 drive said shaft 117 from the roller 92 so that the peripheral speed of all of the rollers that engage with the label strip is the same.

A knife frame is provided including a bar 122, end arms 123 extending therefrom and a second bar 123a (Fig. 6) connecting the arms. On the second bar a cutting blade 124 is secured which in its upper position is located over the label strip so that on downward movement it will engage with the label strip between two oppositely disposed slots 29a therein and in conjunction with the lower knife 113 will cut the end label from the strip dropping it onto the wrapping paper in a position substantially under the finger 109. The knife frame is an open frame and between the ends 123 thereof the heater 102 may move upwardly and downwardly. At its ends it is provided with downwardly extending arms 125 pivoted on a cross rod 126. A pin 127 extends from one of the end bars 123 (Fig. 8) and carries a roller 128 which rides on a second disk-like cam 129 secured to the shaft 66. Cam 129 is a circular disk except for a concave depression 130 of relatively short length (Fig. 7) into which the roller 128 momentarily drops, at which time the knife blade 124 moves downwardly and across the label strip to sever a label followed by an immediate return to its upper normal position. In practice the frame 124 is actuated by a tension spring (not shown) which tends to pull it in a downward direction and holds the roller 128 against the edge of the disk 129 and causes it to enter the recess 130 when reached.

Figure 6:
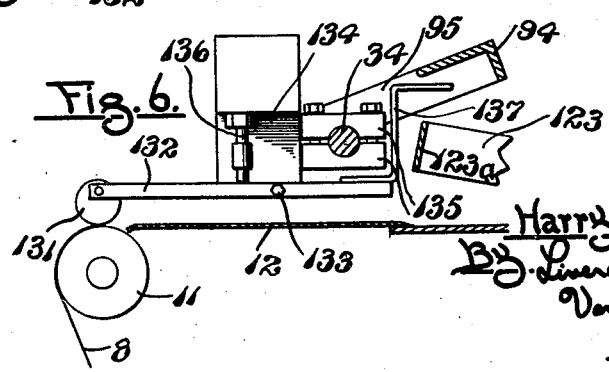
Fig. 6 is a fragmentary transverse vertical section substantially on the plane of line 6—6 of Fig. 4.
Figure 10:
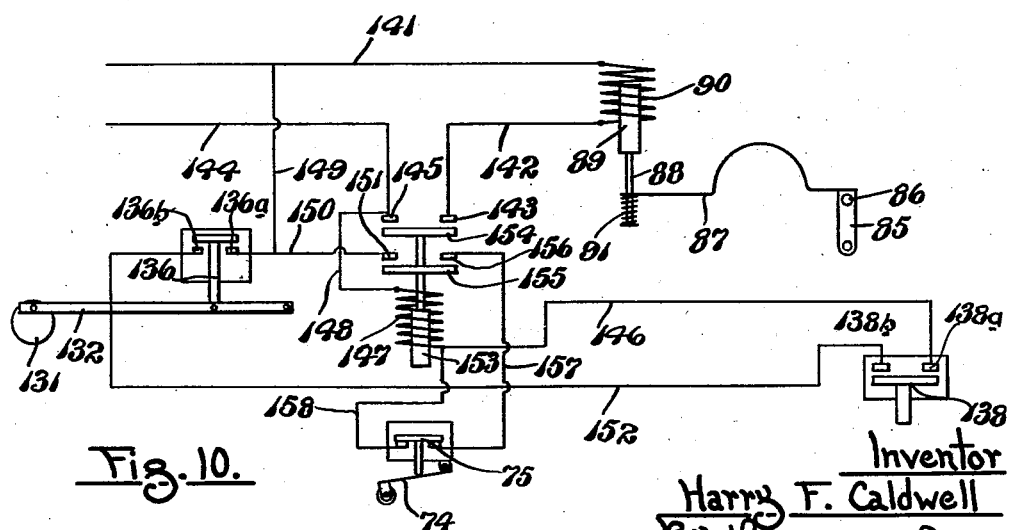
Fig. 10 is a diagrammatic representation of the electric circuits controlling the machine.

Directly over the roller 11 around the upper portion of which the wrapping paper 8 passes (Figs. 3 and 6) a roller 131 is located and between which and roller 11 the paper passes. The roller 131 is eccentrically mounted at the end of a bar 132 which is pivotally mounted between its ends at 133 on a switch housing 134 clamped by means of clamping members 135 on the rod 34. The switch housing has a switch therein with a depending stem 136 which rests upon the upper side of the bar 132 at a point between the pivot 133 and the roller 131 (Fig. 6). When the outer end of the bar 132 is depressed the stem 136 of the switch following the bar causes a bridging of the contacts 136a and 136b to complete a break in an electric circuit (Fig. 10). At the inner end of a bar 132 a Z-shaped finger 137 of sheet metal is attached, the terminal flange of which extends below a flange of the bar 94 (Fig. 6).

In the wiring circuit, diagrammatically illustrated in Fig. 10, a make and break switch 138 is used which is mounted upon the wrapping machine frame (Fig. 1). It is not particularly important exactly where this switch shall be placed, so long as it is in the path of movement of an element of the wrapping machine which will actuate the switch once during each cycle of the wrapping machine. As shown in Fig. 1 it is mounted adjacent a revolvable drum 139 which makes one revolution during each cycle of the machine and is in the path of movement of a roller 140 carried by a crank on said drum 139 so that the roller will engage the switch as it passes by it and for an instant cause the switch to close to bridge the contacts 138a and 138b (Fig. 10).

With the wiring diagram shown in Fig. 10, the wire 141 coming from a source of electrical energy, for example, the positive side of a battery or any other suitable source, is connected with one end of the winding of the solenoid 90. The other end of the winding is connected by wire 142 with a contact 143 which is one of the contacts of a relay switch conveniently mounted on the machine, as indicated at R in Fig. 9. The other wire 144 from the negative side of the battery or other source of energy connects with a contact 145 associated with and spaced from the contact 143, the space between said contacts to be bridged by a bridging bar as later described. A wire 146 leads from the contact 138a of switch 138 to one end of a solenoid winding 147 forming a part of the relay switch R, the other end of the winding being connected by a wire 148 with the return main wire 144.

A wire 149 connects the first mentioned main wire 141 with a wire 150 which at one end is joined with a contact 136a of the switch 136 associated with the bar 132. The other end of the wire 150 is joined with a contact 151 which is shown as directly below the contact 145. The opposite contact 138b of the switch 138 is connected by a wire 152 with another contact 136b of switch 136. The solenoid winding 147 has associated therewith an armature 153 which has a rod extending therefrom secured to which are two spaced apart bridging bars 154 and 155, one of which is to bridge the space between contacts 143 and 145 and the other between the contacts 151 and 156 spaced therefrom, which latter contact is connected by wire 157 with one of the spaced contacts of the switch 75. The other contact of switch 75 is connected by the wire 158 with the wire 146 substantially at the point of juncture of said wire with one end of the solenoid winding 147.

Operation

With the machine as disclosed, the wrapping paper 8 in the operation of the wrapping machine is drawn through the labeling machine to supply wrappers for the articles, such as loaves of bread or any other articles to be wrapped.

The movement of the wrapping paper actuates the roller 131 to cause a bridging connection between the contacts 136a and 136b of switch 136. The roller 131 rotating counterclockwise (Fig. 10) will continue to rotate only far enough that the bar 136 will be lowered to connect the contacts 136a and 136b, after which the paper will slip underneath such roller 131, the switch remaining closed until a cycle of the machine has gone through as hereinafter appearing.

The electric motor 84 continuously operating does nothing further until the clutch parts 79 and 81 are connected. This will occur when switch 138 is closed. With the switches 136 and 138 closed current through the wires 140, 149 and 150 passes the switch 136 and through the wire 152, goes to and passes the switch 138, following therefrom through wire 146 to the solenoid 147 and therefrom through the wire 148 to the other main wire 144 of the electric circuit.

The closure of the switch 138 will be but momentary, since the roller 140 will quickly pass by after its closing operation on switch 138. But while switch 138 is closed the solenoid winding 147 (Fig. 10) will be energized, causing the armature 153 to move and carry the bridging bars 154 and 155 into bridging engagement respectively with the contacts 143 and 145 and the contacts 156 and 151. The connection of contacts 143 and 145 will complete a circuit through the wire 140, the solenoid winding 90, the wire 142, bar 154 and the return wire 144. This will operate the armature 89 to bring the clutch members 79 and 81 into operative connected relation. Likewise the engagement of the bar 155 with the contacts 156 and 151 will complete another circuit, the current flowing through wires 140, 149, 150, bar 155, the wire 157, through the switch 75, wire 158, solenoid winding 147, wire 148 and the return wire 144. In this way a continuance of current through the solenoid winding 147 is insured after switch 138 opens. Therefore, the solenoid 90 will continue to receive an electric current and will hold the clutch members 79 and 81 together as long as switch 75 is in closed position. Normally switch 75 is in closed position and is opened only when the roller 71 (Fig. 9) in the counter-clockwise rotation of the disk cam 65 strikes the switch actuating lever 74. For example, in Fig. 9, the roller has immediately previously engaged said lever and opened the switch, thus breaking the circuit supplying the solenoid winding 147 so as to de-energize the solenoid with a lowering of the bridging bars 154 and 155 which automatically breaks the circuit supply current to solenoid 90, whereupon clutch members 79 and 81 are disengaged, a cycle of the machine having been completed.

Figure 7:
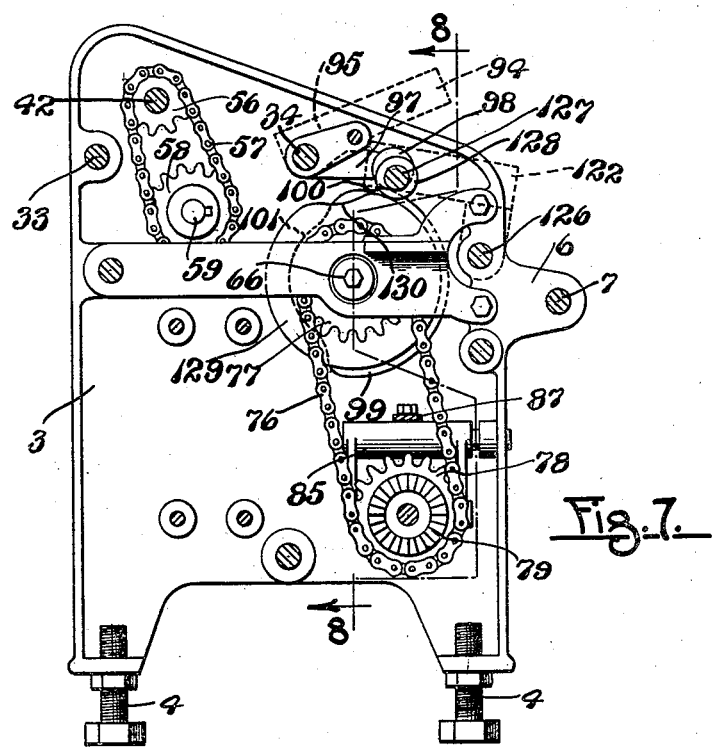
Fig. 7 is a transverse vertical section and end illustration on the plane of line 7—7 of Fig. 8.
Figure 8:
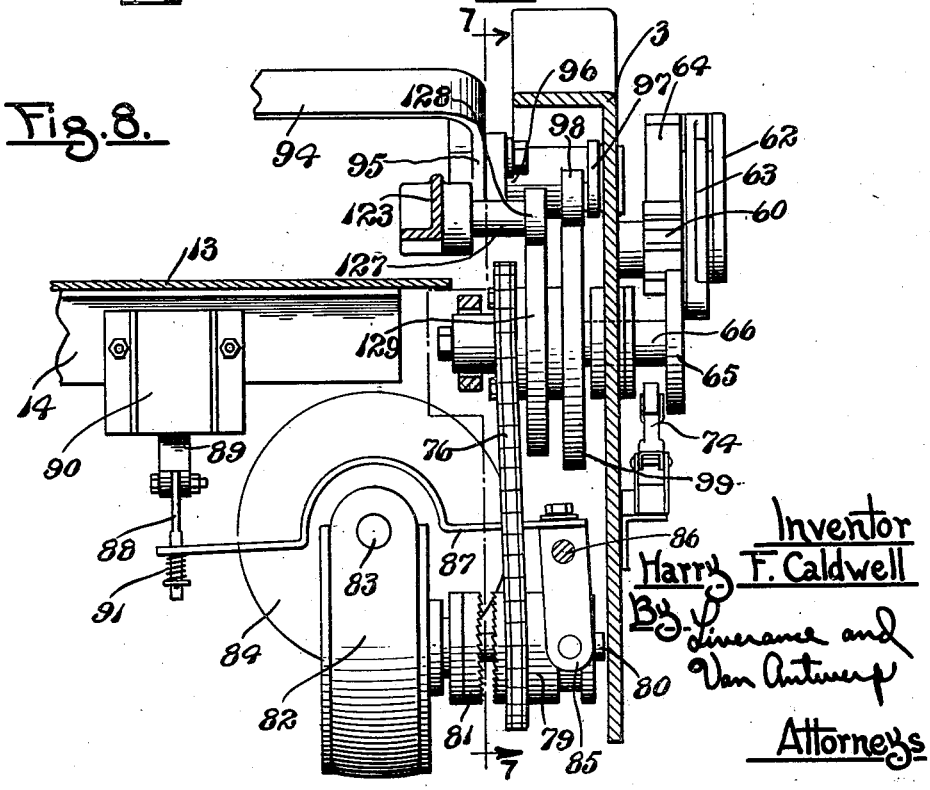
Fig. 8 is a fragmentary longitudinal section on the plane of line 8—8 of Fig. 7.

During this cycle of the machine with clutch members 79 and 81 in engagement, shaft 66 is rotated through one revolution. The clutch members 79 and 81 remain in connection during one complete revolution only of the shaft 80, the sprocket wheels around which chain 76 passes (Fig. 8) being of the same diameter (Fig. 7). Such one revolution causes a single step movement of the shaft 59 through the dog 64 and the ratchet wheel 60. That is, with the parts in the position in Fig. 9, the disk 65 rotating counter-clockwise moves the dog 64 from the tooth of ratchet wheel 60 with which it is engaged counter-clockwise to the next adjacent tooth and then reciprocates the connecting rod 63 in the opposite direction, moving the ratchet wheel clockwise one step or one-eighth of a revolution.

Shaft 59 in its partial revolution driving the chain 57 (Fig. 7) will drive the shaft 42 part of a revolution. The pitch diameter of the wheel 58 being twice that of the sprocket wheel 56 (Fig. 7), shaft 42 will be turned one-quarter of a revolution, thus moving the drum 43 thereon one-quarter of a revolution or sufficient to pull the label strip a distance equal to the width of one label, or that between two consecutive pairs of slots 29a.

The printing mechanism is operated by closing the switch at 73 when the roller 71 comes to its actuating lever 72 (Fig. 9). That is, the label strip will be at rest when the printing unit is operated and the printing unit will return to its initial position by the time the dog 64 engages with a tooth of the ratchet wheel 60, causing movement of the label strip the described distance to bring the next succeeding label into position for operation thereon by the printing mechanism. It is of course to be understood that the circuit for the printing unit is an independent circuit, is of simple form containing only the solenoid winding 55, switch 73 and a source of electric energy connected by wires, that the switch 73 is normally open and is closed momentarily when roller 71 engages the switch closing lever 72. Furthermore, if labels which have been previously printed are to be used this circuit may be interrupted, for example, by disconnecting a wire, so that the printing unit will not operate during operation of the machine. Therefore, the printing unit is available selectively for use or non-use as conditions may require.

The rotation of shaft 68 likewise rotates the two cams 99 and 129 secured thereto through one revolution. The rotation of the cam 129 controls the operation of the knife blade 124 cutting off the end label when roller 128 comes to the recess 130 (Fig. 7) and returning the knife blade to upper position substantially instantaneously after the roller leaves such depression. The recess 100 in the cam 99 comes to the roller very slightly before the knife blade operation with a slight lowering of the bar 94 and a release of the bar 114 which, under the influence of the springs 120, will turn slightly in a clockwise direction bringing the finger 109 into yielding pressing engagement against the end label slightly before it is severed from the label strip, insuring that the label will stay in position with respect to the paper 8 during the cutting operation and will not accidentally or aimlessly move to an undesired position.

The roller 98 has the longer depression 101 brought to it with a consequent clockwise swinging of the bar 94 and its end arms 95 to lower the heating unit 102 against a severed label lying on the paper. The heating unit is preferably heated by an electric resistance coil and is divided at one end to pass at either side of the narrow spring finger member 108—109 substantially covering the label which is held by the terminal finger 109 against the paper with a consequent cementing of the label to the paper at the outer side thereof. In the finished wrapped article the label applied to the wrapper will be at the outer side and away from any of the contents which is wrapped.

The switch 136 will remain closed during the cycle until the heater is lowered for its label cementing operation. When the switch 136 is closed by a lowering of the outer end of the bar 132 there is a corresponding lifting of the finger 137 at the inner end of the bar. The clockwise rotative movement of the bar 94 when the heater is lowered causes a flange thereof (Fig. 6) to engage said finger 137 thereby lifting the outer end of the bar 132 and elevating the switch 136 to break its connection with the contacts 136a and 136b until the switch is again closed by the movement of the wrapping paper 8 rotating the roller 136 counter-clockwise a sufficient distance to again lower the bar 132 so that the switch is again closed, putting the machine in condition for a succeeding cycle of operation when switch 138 has been closed by the action of a moving part in the cycle of operation of the wrapping machine itself.

The adjustment of the roller 17 changes the relative positions of the labels one after another deposited on the wrapping paper. For example, when the labeling machine is associated with a bread wrapping machine, a change in the size of the loaf to be wrapped requires a change in the adjustment of the wrapping machine to provide a different length of wrapper; and in order to have the label properly appear on the wrapped loaf it must be correspondingly adjusted to be properly deposited and secured to the paper, one of such labels for each wrapper used with each loaf of bread.

It is further to be understood that the label attaching machine is capable of operation apart from a wrapping machine. Such label attaching machine may be used, for example, in affixing labels to a continuous length of wrapping paper at properly spaced apart intervals thereon, and the wrapping paper either rolled into a complete roll after the labels are attached or cut into sheets each with a label attached for subsequent use in wrapping articles. In such case there is required only association with a machine to trip the switch 138 at adjustable properly spaced or timed intervals which mechanism does not need to be an entire wrapping machine. Furthermore, articles which have been wrapped and desirably should be labeled may, through a modification of this machine, have such labels attached, feeding the wrapped articles through the machine in a manner similar to the way the wrapping paper is drawn through the machine, said articles being stopped in movement periodically at the proper points to receive and have attached the label.

With the present machine the wrapping paper is drawn into the wrapping machine with stop intervals between movements of the wrapping paper. That is, a length of the wrapping paper sufficient to wrap a single article is drawn into the machine cut from the roll and is used to wrap a loaf of bread or other article. In the operation of the wrapping machine, for example, as shown in the previously referred to application of myself and Tuthill jointly, such periodic movements of the paper takes place. The present labeling machine deposits and cements the label on the paper at the intervals of rest between movements of the paper, the label being yieldingly held in place and against displacement and cemented to the paper while thus held.

While a specific and very practical and effective construction of label attaching machine of the character noted is disclosed, various other specific embodiments employing the same or equivalent principles of operation may be produced within the scope of the claims appended hereto defining the invention, and my invention is to be considered as comprehending all forms of construction coming within the scope of said claims.

I claim:

1. In a label attaching machine, means for passing a length of paper through the machine, means for carrying a continuous length of connected labels to the paper and moving said labels in the same general direction the paper is moved and at an acute angle to the surface of the paper to which applied, means for periodically severing the end labels one after another from said connected strip and applying them at spaced intervals upon the paper, a driving motor, and means for connecting the motor with the label carrying means to periodically and at predetermined intervals move the label strip into positions for successive severing of end labels therefrom.

2. In a label attaching machine, a table over which lengths of wrapping paper are adapted to be successively positioned, means for supporting a continuous length of connected labels on the machine, means for guiding and carrying said labels through the machine to position the end label at an acute angle to the paper over a length of paper, means for driving said label carrying means in step by step movements at periodic intervals to successively bring an end label to the paper, means for periodically severing the end labels one after another to deposit them on the paper, means for pressing the end labels against the paper immediately before severing and for holding the labels against the paper after they have been severed for a period of time and means for securing the labels to the paper while thus held.

3. In a label attaching machine, a table over which successive lengths of wrapping paper are adapted to be positioned, feeding means for a continuous length of labels located in end to end connected relation so as to carry a free end of the label strip to and over the paper, a continuously running prime mover normally disconnected from the label feeding means, clutch means for connecting the motor to the label feeding means, means for connecting said clutch means at periodic intervals to feed the labels in step by step movements, means for severing the end label located over the paper from the label strip at the times between feeding movements of the labels, yielding means pressing an end label immediately before and after it is severed from the strip against the paper, and securing means movable against the label to press it against the paper and secure it thereto, said securing means, yielding pressing means and label severing means being operable by said prime mover, as specified.

4. In a label attaching machine, a horizontal table, rollers at opposite edges thereof over which wrapping paper is adapted to be drawn to pass over the table predetermined distances with periods of rest for the paper between movements thereof, a spool on which a plurality of connected labels are wound in a roll in a continuous strip, guiding and carrying means for the strip of labels to guide and carry them so that the free end of the strip is carried to and over the paper, driven means for pulling the label strip from said spool, means for driving said feeding means in a step by step movement with rest periods between movements, means for severing end labels from a strip of labels in succession at successive rest periods of the label strip to thereby deposit the severed labels on the paper one after the other, an electric motor for driving said label feeding means normally disconnected therefrom, an electric circuit including a switch in which the electric motor is interposed, means for closing said switch at predetermined times in relation to the movement of the paper over the table, clutch means for connecting the motor with the label feeding means, and solenoid means for connecting the clutch means together on closing the electric circuit to thereby connect the motor with the label feeding means at predetermined times.

5. A construction containing the elements in combination defined in claim 4, combined with a second switch in said electric circuit normally held in open position, and means for closing said second switch upon longitudinal movement of the paper over the table whereby the machine is incapable of operation except when paper is moved over the table upon which the label is to be deposited.

6. A construction containing the elements in combination defined in claim 4, combined with a second switch in said electric circuit normally held in open position, means actuated by the movement of paper over the table for closing said switch, a heating element mounted above the table and movable downwardly to press against the label and secure it to the paper after the label has been severed, said heating means being raised and lowered by said electric motor, and means operated by the return of said heating means to upper position for disconnecting said second switch after a label has been secured to the paper and rendering the machine incapable of operation until there has been a further movement of the wrapping paper over said table.

7. A construction containing the elements in combination defined in claim 4 combined with a second switch in said electric circuit, said second switch being in normally open position, means operable by the paper in its movement over the table for closing said second switch, heating means operated by the electric motor for securing a label to the paper, means operated by the heating means for reopening said second switch for closure thereof at the next succeeding movement of the paper over the table, a third normally closed switch in said electric circuit and means for opening said third switch momentarily to disconnect the clutch connection of said motor at the completion of a label attachment to the paper.

8. A label attaching machine including, a driven means for moving labels connected together in a continuous strip through the machine to carry the end label of the strip to a predetermined position, means for severing said end label when it has reached such position, a power means for driving said label moving and label cutting means, a clutch between said power means and said label cutting and label moving means adapted to be connected for driving said label cutting and label moving means from said power means, said clutch means being normally disconnected, a solenoid for operating said clutch means to connect the same, an electric circuit in which said solenoid is located, a control switch in said circuit, the closure of which completes the circuit and connects the clutch means, a normally closed second switch in said electric circuit, and means for momentarily opening said second switch after a predetermined actuation of the label moving and label cutting means, as specified.

9. A machine of the class described having a table over which material to which labels are to be attached is adapted to be moved, means for guiding and carrying a plurality of labels connected together in a continuous strip into the machine to successively move end labels of said strip to a predetermined position over the table and over the material to which the labels are to be attached, a shaft, a disk thereon, a rod connected to said disk at a distance from its center, a second shaft for driving the labels, a ratchet wheel thereon, means between the ratchet wheel and said rod for engaging said ratchet wheel and moving it and its shaft a step of movement with each rotation of the disk, a power means, means between said power means and disk including a normally disconnected clutch for driving the disk when the clutch is connected, means for connecting the clutch at spaced apart intervals of time, combined with means for releasing the clutch for disconnection as and for the purposes specified.

10. A construction containing the elements in combination defined in claim 9, combined with a cam connected and rotatable with said disk, and label cutting means operated by said cam for severing end labels from the strip of labels one at a time with each successive feeding of the labels, as specified.

11. A construction containing the elements in combination defined in claim 9, combined with two cams connected and rotatable with said disk, means operated by one of said cams for severing the end labels from the strip of labels, and means operated by the other cam for controlling and causing the lowering of a heating means against a severed label to press it against the material to which the label is to be attached and thereby secure the severed label thereto.

12. In a label attaching machine, a table over which paper to receive labels is adapted to be moved predetermined distances with periods of rest between movements thereof, means for carrying and guiding a continuous length of connected labels in a strip through the machine whereby the end of the strip is fed to the paper at a point where the labels are to be deposited, said feeding of the labels being in periodic step by step movements with rest periods between movements, means for severing the end labels from the strip in succession at successive rest periods between movements of the label strip, said severing of the label occurring when the paper is at rest, and means for securing a severed label to the paper.

13. A label attaching machine having means for moving paper therethrough, said paper being adapted to be moved at predetermined intervals with periods of rest therebetween, means for periodically unwinding a continuous length of connected labels from a roll of labels and guiding the end label at an acute angle to the surface of the paper to which it is to be applied to and over said paper at periodic intervals to apply the labels to said paper at spaced apart distances in the length thereof, means for severing said end labels one after another, one at each period of rest of the paper and means for attaching the labels to the paper in succession one after the other at predetermined intervals in the length of said paper.

14. A label attaching machine having means for moving paper therethrough, said paper being adapted to be moved at predetermined intervals with periods of rest therebetween, means for carrying labels in a continuous length to a side of the paper in a direction at an acute angle to the surface of the paper, means for periodically severing the end label for application to the paper and means for attaching the label to the paper while the paper is at rest.

15. In a label attaching machine, means for supporting a continuous length of connected labels in the form of an elongated strip, means for guiding and carrying said label strip through the machine to position the end labels at a predetermined position at an acute angle to the horizontal, means for driving said label carrying means in step by step movements at periodic intervals to successively bring said end labels to said predetermined position and to stop said label carrying means when said predetermined position is reached, means for severing said end labels one after another at successive stopping thereof, and means for securing the severed labels to material thereunder after they have been severed with said material and said labels at rest between successive movements of the strip of labels.

HARRY F. CALDWELL.